(12) United States Patent
Grossmann

(10) Patent No.: US 11,577,611 B2
(45) Date of Patent: Feb. 14, 2023

(54) METHOD AND DEVICE FOR DISCHARGING A HIGH-VOLTAGE INTERMEDIATE CIRCUIT OF A VEHICLE WITH A DISCHARGE UNIT

(71) Applicant: Robert Bosch GmbH, Stuttgart (DE)

(72) Inventor: Ekard Grossmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 16/617,751

(22) PCT Filed: May 16, 2018

(86) PCT No.: PCT/EP2018/062692
§ 371 (c)(1),
(2) Date: Nov. 27, 2019

(87) PCT Pub. No.: WO2018/219644
PCT Pub. Date: Dec. 6, 2018

(65) Prior Publication Data
US 2020/0189394 A1    Jun. 18, 2020

(30) Foreign Application Priority Data
May 31, 2017  (DE) .................... 10 2017 209 106.1

(51) Int. Cl.
*B60L 3/00*  (2019.01)
*H02J 7/00*  (2006.01)
(52) U.S. Cl.
CPC .......... *B60L 3/0046* (2013.01); *H02J 7/0069* (2020.01); *B60L 2210/10* (2013.01)

(58) Field of Classification Search
CPC .... B60L 3/0046; B60L 2210/10; H02J 7/0069
See application file for complete search history.

(56) References Cited

U.S. PATENT DOCUMENTS

| | | | |
|---|---|---|---|
| 2011/0093148 A1* | 4/2011 | Kuehner | B60L 3/04 180/65.265 |
| 2013/0214745 A1* | 8/2013 | Funaba | H02M 1/36 320/166 |

(Continued)

FOREIGN PATENT DOCUMENTS

| | | |
|---|---|---|
| CN | 101888939 A | 11/2010 |
| CN | 103248040 A | 8/2013 |
| CN | 105264761 A | 1/2016 |

(Continued)

OTHER PUBLICATIONS

International Search Report for Application No. PCT/EP2018/062692 dated Sep. 6, 2018 (English Translation, 2 pages).

*Primary Examiner* — Carlos Amaya
(74) *Attorney, Agent, or Firm* — Michael Best & Friedrich LLP

(57) ABSTRACT

The invention relates to a method (400) for discharging a high-voltage intermediate circuit (110) with a discharge circuit (120), wherein the high-voltage intermediate circuit (110) comprises an intermediate circuit capacitor (130), having the steps of: ascertaining (410) the voltage (U_ZK) of the high-voltage intermediate circuit (110); and actuating (420) the discharge circuit (120) on the basis of the ascertained voltage (U_ZK).

14 Claims, 2 Drawing Sheets

(56) References Cited

U.S. PATENT DOCUMENTS

2013/0257446 A1\* 10/2013 Soell ..................... B60L 3/0069
                                                        324/503
2014/0191693 A1\* 7/2014 Funaba .................. H02P 27/06
                                                        318/139

FOREIGN PATENT DOCUMENTS

| DE | 102009055053 | 6/2011 |
|----|--------------|--------|
| DE | 112012003166 | 4/2014 |
| DE | 102015223546 | 6/2017 |
| EP | 2284982      | 2/2011 |
| WO | 2009106187   | 9/2009 |

\* cited by examiner

METHOD AND DEVICE FOR DISCHARGING A HIGH-VOLTAGE INTERMEDIATE CIRCUIT OF A VEHICLE WITH A DISCHARGE UNIT

BACKGROUND OF THE INVENTION

The invention relates to a method and a device for discharging a high-voltage intermediate circuit of a vehicle with a discharge circuit. The invention also relates to a drive train having a corresponding device and to a vehicle having a drive train and to a computer program and a machine-readable storage medium.

WO 2009/106187 A1 discloses a method and a device for discharging a high-voltage network. In conventional vehicles, the voltage in the vehicle electrical system is approximately 14 volts. In hybrid vehicles or vehicles with an electric drive, voltages which can be several hundred volts are used in the traction network. Electrical voltages which are greater than 60 volts are referred to as high voltage. For reasons of safety, high-voltage networks, in particular vehicle electrical systems or traction networks, must be disconnectable and must be able to be discharged. For this purpose, known high-voltage networks comprise an active discharge device. This device generally comprises a two-pole main switch for disconnecting the battery from the rest of the network and a switchable resistor which is used to dissipate the charge if necessary. Alternatively, a passive discharge device can also be used. This device generally comprises at least one resistor which is connected in parallel with the energy store and with the high-voltage network. Such passive discharge circuits are configured to discharge an intermediate circuit capacitance in the high-voltage network, in particular a so-called intermediate circuit capacitor, within a predefined time, usually 120 seconds, to a voltage of less than 60 volts (contact safety) irrespective of a voltage which occurs initially. There is the need to provide alternative discharge methods and devices for high-voltage networks of vehicles.

SUMMARY OF THE INVENTION

A method for discharging a high-voltage intermediate circuit of a vehicle with a discharge circuit is provided, wherein the high-voltage intermediate circuit comprises an intermediate circuit capacitor. The method comprises the steps of:
  determining the voltage across the high-voltage intermediate circuit;
  controlling the discharge circuit on the basis of the determined voltage.

A method for discharging a high-voltage intermediate circuit of a vehicle with a discharge circuit is provided. The high-voltage intermediate circuit comprises an intermediate circuit capacitor which, for example for operating an electrical machine, is connected, on the high-voltage side, between a pulse inverter and a high-voltage battery for smoothing the current and voltage spikes produced during operation of the pulse inverter. Within the scope of the method, the voltage across the high-voltage intermediate circuit is determined, in particular first of all. A voltage measurement is carried out for this purpose, wherein the voltage across potentials of the high-voltage intermediate circuit, which are electrically connected to the connections of the intermediate circuit capacitor, is measured. The discharge circuit is controlled on the basis of this determined voltage. A method for discharging a high-voltage intermediate circuit of a vehicle is advantageously provided.

In another configuration of the invention, an operating voltage range having an upper operating voltage value and a lower operating voltage value of the high-voltage intermediate circuit is predefined. The control of the discharge circuit comprises minimizing the current through the discharge circuit if the determined voltage of the high-voltage intermediate circuit is less than the upper operating voltage value and greater than the lower operating voltage value of the high-voltage intermediate circuit.

In order to control the discharge circuit on the basis of the determined voltage, an operating voltage range which is predefined by means of an upper operating voltage value and a lower operating voltage value of the high-voltage intermediate circuit is defined. The determined voltage is compared with the upper operating voltage value and the lower operating voltage value of the high-voltage intermediate circuit. If the determined voltage of the high-voltage intermediate circuit is within the operating voltage range, that is to say is less than the upper operating voltage value and is greater than the lower operating voltage value, the current through the discharge circuit is minimized. In this context, avoiding a current through the discharge circuit, for example by DC-isolating the discharge circuit from the high-voltage intermediate circuit, or setting a current which is as low as possible through the discharge circuit, for example on account of parasitic losses, should be understood as being synonymous with minimizing the current through the discharge circuit, in particular. An efficient method for discharging a high-voltage intermediate circuit of a vehicle is advantageously provided. No discharge is intended to take place as long as the voltage of the high-voltage intermediate circuit is within the operating voltage range. The power loss of the discharge circuit is minimized within this range.

In another configuration of the invention, the control of the discharge circuit comprises increasing the current through the discharge circuit if the determined voltage of the high-voltage intermediate circuit is greater than the upper operating voltage value or less than the lower operating voltage value of the high-voltage intermediate circuit.

The determined voltage is compared with the upper operating voltage value and the lower operating voltage value of the high-voltage intermediate circuit. If the determined voltage is outside the operating voltage range, that is to say the determined voltage of the high-voltage intermediate circuit is greater than the upper operating voltage value or less than the lower operating voltage value, the current through the discharge circuit is increased. In this context, maximizing the current through the discharge circuit or setting a high discharge current should be understood as being synonymous with increasing the current through the discharge circuit, in particular. This is carried out, for example, by switching on additional loads which are electrically connected to the high-voltage intermediate circuit for this purpose. This establishes a discharge current which is very high or significantly greater than the minimized current through the discharge circuit if the determined voltage of the high-voltage intermediate circuit is within the operating voltage range. An efficient discharge circuit is advantageously provided, which discharge circuit increases the discharge current, in particular, or sets a high discharge current if the determined voltage is outside the operating voltage range.

In another configuration of the invention, the control of the discharge circuit comprises increasing the current through the discharge circuit in a manner inversely proportional to the falling determined voltage of the high-voltage intermediate circuit.

Control of the discharge circuit is provided, in which the current through the discharge circuit is increased in a manner inversely proportional to the falling determined voltage of the high-voltage intermediate circuit. A discharge method is therefore advantageously provided, which method discharges the high-voltage intermediate circuit with a constant power. A predefinable, for example maximum, discharge power of the discharge circuit is not exceeded and the duration of the discharge operation is minimized at the same time.

In another configuration of the invention, a current limit value of the current through the discharge circuit is predefined. The control of the discharge circuit comprises limiting the current through the discharge circuit if the current through the discharge circuit exceeds the current limit value.

In order to prevent overloading of the discharge circuit, a current limit value of the current through the discharge circuit is predefined. The current through the discharge circuit is determined and is compared with the current limit value. If the current through the discharge circuit exceeds this current limit value, the current through the discharge circuit is limited, for example to the value of the current limit value. A method which prevents overloading of the discharge circuit is advantageously provided.

In another configuration of the invention, a contact voltage value of the high-voltage intermediate circuit is predefined. The control of the discharge circuit comprises reducing the current through the discharge circuit if the determined voltage is less than the contact voltage value of the high-voltage intermediate circuit.

A contact voltage value of the high-voltage intermediate circuit is predefined for the method; in particular, the contact voltage value is 60 volts. The determined voltage is compared with the contact voltage value. If the determined voltage is less than the contact voltage value of the high-voltage intermediate circuit, the control of the discharge circuit comprises reducing the current through the discharge circuit. An efficient method for discharging a high-voltage intermediate circuit is advantageously provided, in which the current through the discharge circuit is minimized if a discharge is not required since the voltage is already below the contact voltage value.

The invention also relates to a computer program which is configured to carry out the methods described above.

The invention also relates to a machine-readable storage medium on which the described computer program is stored.

The invention also relates to a device for discharging a high-voltage intermediate circuit of a vehicle with a discharge circuit, wherein the high-voltage intermediate circuit comprises an intermediate circuit capacitor; wherein the device comprises means for determining a voltage across the high-voltage intermediate circuit and for controlling the discharge circuit on the basis of the determined voltage.

A device for discharging a high-voltage intermediate circuit with a discharge circuit is provided. The high-voltage intermediate circuit comprises an intermediate circuit capacitor. The device comprises, in particular first, means which make it possible to determine the voltage across the high-voltage intermediate circuit, that is to say, in particular, across potentials of the high-voltage intermediate circuit which are electrically connected to the connections of the intermediate circuit capacitor. The device also comprises, in particular second, means which make it possible to control the discharge circuit on the basis of the determined voltage.

In another configuration of the invention, the discharge circuit comprises a linear regulator, a switching regulator or a DC/DC converter.

A discharge circuit having a linear regulator, a switching regulator or a DC/DC converter is provided. A possibility for implementing the discharge circuit is advantageously provided.

In another configuration of the invention, the discharge circuit comprises a switchable load, in particular a load resistor.

Another possibility for implementing the discharge circuit is advantageously provided.

The invention also relates to a drive train having a device and power electronics and/or having a high-voltage battery and/or an electric drive, in particular.

Such a drive train is used to drive an electric vehicle, for example. The method and the device enable safe operation of the drive train.

The invention also relates to a vehicle having a described device. A vehicle comprising a device which can be used to efficiently discharge a high-voltage intermediate circuit is therefore advantageously provided.

It goes without saying that the features, properties and advantages of the method according to the invention accordingly apply or can be applied to the device and the drive train and the vehicle and vice versa.

BRIEF DESCRIPTION OF THE DRAWINGS

Further features and advantages of embodiments of the invention emerge from the following description with reference to the accompanying drawings.

The invention shall be explained in more detail below on the basis of some figures, in which.

DETAILED DESCRIPTION

Figure 1:
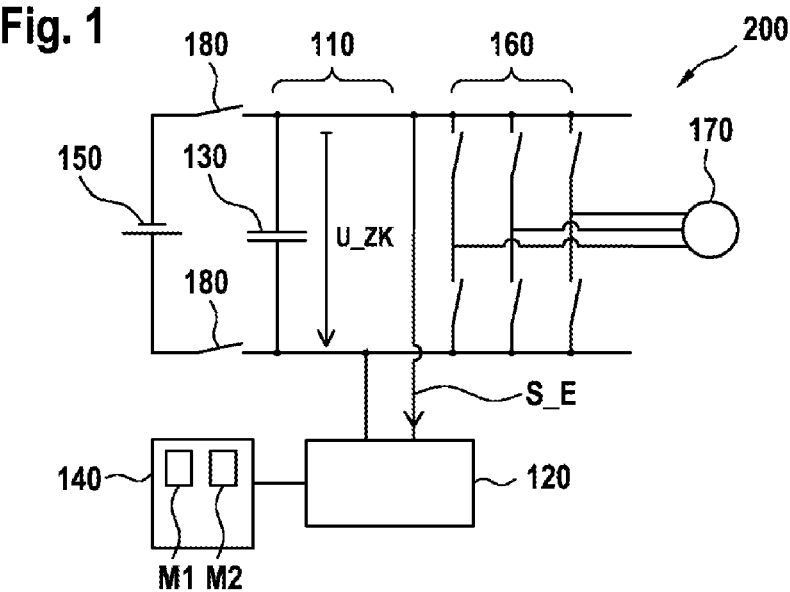
FIG. 1 shows a schematic illustration of a drive train having a device for discharging a high-voltage intermediate circuit of a vehicle.

FIG. 1 shows, by way of example, an electrical drive train 200 having a device 140 for controlling a discharge circuit 120 for discharging a high-voltage intermediate circuit 110. The high-voltage intermediate circuit comprises an intermediate circuit capacitor 130 to which the intermediate circuit voltage U_ZK is applied. The drive train 200 comprises, in particular, a high-voltage battery 150 which can be connected to the high-voltage intermediate circuit 110 and disconnected from the latter by means of at least one switch 180. The drive train 200 also comprises, in particular, a pulse inverter 160 which is schematically illustrated as a B6 bridge in FIG. 1. The drive train also comprises, in particular, an electrical machine 170 which is fed with the output voltage from the pulse inverter 160. The device 140 comprises a first means M1 for determining the voltage U_ZK across the high-voltage intermediate circuit, in particular the intermediate circuit voltage, and a second means M2 for controlling the discharge circuit 120. The voltage measurement at the intermediate circuit 110 is carried out by means of known voltage measuring methods and devices which, as a result, transmit a signal corresponding to the determined voltage U_ZK to the device 140. The discharge circuit 120 is electrically connected to the two connections of the intermediate circuit capacitor 130 and makes it possible to discharge the high-voltage intermediate circuit 110. The discharge current S_E is illustrated as a current flowing through the discharge circuit 120 in FIG. 1.

Figure 2:
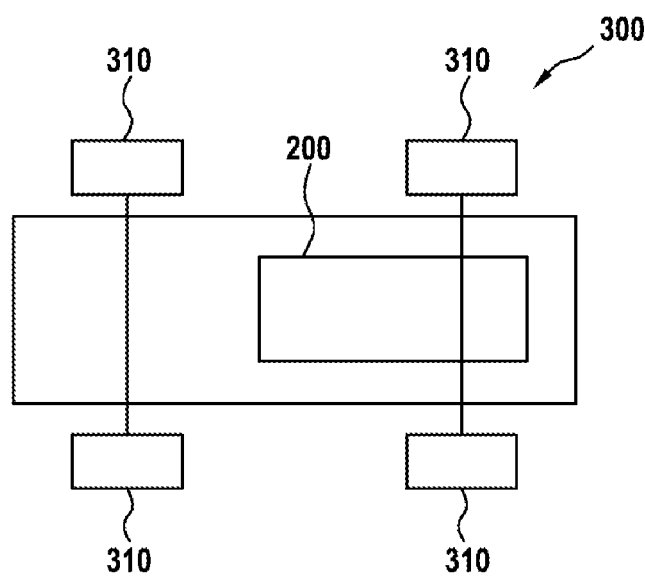
FIG. 2 shows a schematically illustrated vehicle having a drive train.

FIG. 2 shows a schematically illustrated vehicle 300 having a drive train 200. The illustration shows, by way of example, a vehicle having four wheels 310, wherein the invention can likewise be used in any desired vehicles with any desired number of wheels on land, on water and in the air.

Figure 3:
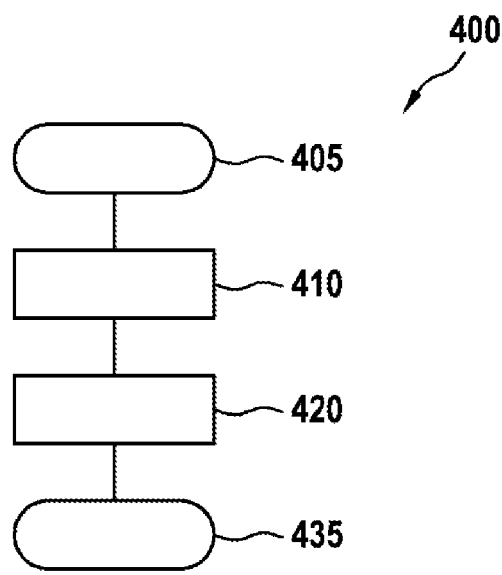
FIG. 3 shows a schematically illustrated flowchart of a method for discharging a high-voltage intermediate circuit of a vehicle.

FIG. 3 shows a schematic sequence of a method 400 for discharging a high-voltage intermediate circuit 110 with a discharge circuit 120. The method begins with step 405. In step 410, the voltage U_ZK across the high-voltage intermediate circuit 110 is determined. In step 420, the discharge circuit is controlled on the basis of the determined voltage U_ZK. The method ends with step 435.

Figure 4:
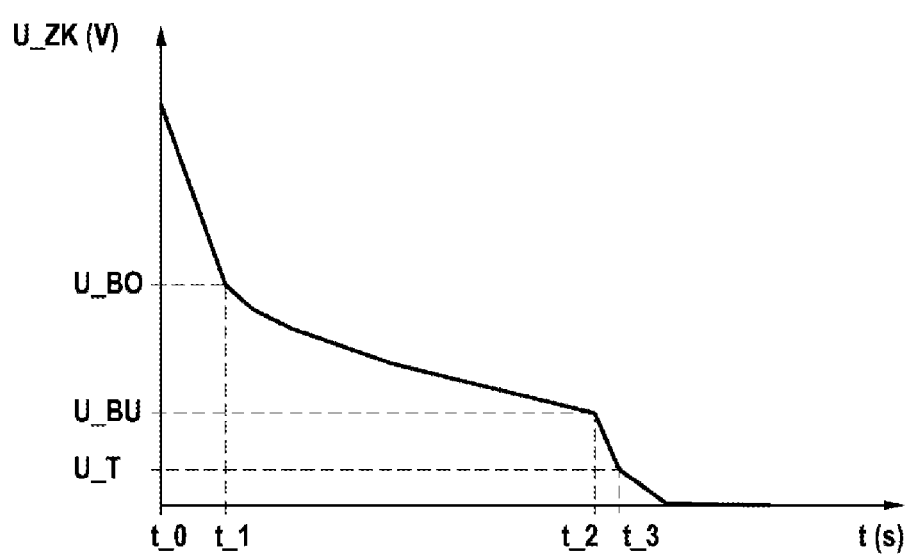
FIG. 4 shows a schematically illustrated voltage/time graph.

FIG. 4 shows a graph in which the voltage across the high-voltage intermediate circuit U_ZK(V) is plotted against the time t(s). At the time t_0, the voltage U_ZK is above the operating voltage range U_B which is limited by the upper operating voltage value U_BO and the lower operating voltage value U_BU. Since the voltage U_ZK at the time t_0 is above the upper operating voltage value U_BO, the device 140 controls the discharge circuit 120 on the basis of the determined voltage U_ZK in such a manner that the discharge current S_E is increased until the voltage U_ZK undershoots the upper operating voltage value U_BO at the time t_1. The device 140 then minimizes the discharge current S_E through the discharge circuit 120 as long as the voltage U_ZK undershoots the upper operating voltage value U_BO and exceeds the lower operating voltage value U_BU. If the voltage U_ZK undershoots the lower operating voltage value U_BU, as illustrated in the graph after the time t_2, the device 140 increases the discharge current S_E through the discharge circuit 120 as long as the voltage U_ZK does not undershoot the contact voltage value U_T. If the voltage U_ZK undershoots the contact voltage value U_T, as illustrated in the graph after the time t_3, the device 140 minimizes the discharge current S_E through the discharge circuit. If no new energy is supplied to the high-voltage intermediate circuit, for example as a result of a battery being coupled via the switches 180 or as a result of induction of a rotating electrical machine 170 via the pulse inverter 160, the voltage U_ZK continuously falls further on account of the parasitic resistances of the components of the high-voltage intermediate circuit. The method is advantageously carried out in a cyclical manner, in particular, with the result that step 410, that is to say the determination of the voltage U_ZK, and step 420 for controlling the discharge circuit 120 on the basis of the determined voltage U_ZK are carried out regularly, in particular continuously. Consequently, the discharge circuit 120 is controlled, in particular, regularly or continuously, in particular is at least partially activated or deactivated or its power consumption is regulated in order to set the discharge current S_E.

The invention claimed is:

1. A method (400) for discharging a high-voltage intermediate circuit (110) with a discharge circuit (120), the high-voltage intermediate circuit (110) comprising an intermediate circuit capacitor (130); the method comprising:

determining (410) a voltage (U_ZK) across the high-voltage intermediate circuit (110);

controlling (420) the discharge circuit (120) on the basis of the determined voltage (U_ZK), wherein an operating voltage range (U_B) having an upper operating voltage value (U_BO) and a lower operating voltage value (U_BU) of the high-voltage intermediate circuit (110) is predefined, and the control (420) of the discharge circuit (120) comprises minimizing the current (S_E) through the discharge circuit (120) when the determined voltage (U_ZK) of the high-voltage intermediate circuit (110) is less than the upper operating voltage value (U_BO) and greater than the lower operating voltage value (U_BU) of the high-voltage intermediate circuit (110).

2. The method (400) as claimed in claim 1, wherein the control (420) of the discharge circuit (120) comprises increasing the current (S_E) through the discharge circuit (120) if the determined voltage (U_ZK) of the high-voltage intermediate circuit is greater than the upper operating voltage value (U_BO) or less than the lower operating voltage value (U_BU) of the high-voltage intermediate circuit (110).

3. The method (400) as claimed in claim 2, wherein the control (420) of the discharge circuit (120) comprises increasing the current (S_E) through the discharge circuit (120) inversely proportional to the falling determined voltage (U_ZK) of the high-voltage intermediate circuit (110).

4. The method (400) as claimed in claim 1, wherein a current limit value (S_G) of the current (S_E) through the discharge circuit (120) is predefined, wherein the control (420) of the discharge circuit (120) comprises limiting the current (S_E) through the discharge circuit (120) if the current (S_E) through the discharge circuit (120) exceeds a current limit value (S_G).

5. The method (400) as claimed in claim 1, wherein a contact voltage value (U_T) of the high-voltage intermediate circuit (110) is predefined, wherein the control (420) of the discharge circuit (120) comprises reducing the current (S_E) through the discharge circuit (120) if the determined voltage (U_ZK) is less than the contact voltage value (U_T) of the high-voltage intermediate circuit (110).

6. A non-transitory machine-readable medium having a computer program which is configured to carry out the method (400) as claimed in claim 1 stored thereupon.

7. A device (140) for discharging a high-voltage intermediate circuit (110) with a discharge circuit (120), wherein the high-voltage intermediate circuit (110) comprises an intermediate circuit capacitor (130); wherein the device (140):

determines a voltage (U_ZK) across the high-voltage intermediate circuit (110) and controls the discharge circuit (120) on the basis of the determined voltage (U_ZK), wherein an operating voltage range (U_B) having an upper operating voltage value (U_BO) and a lower operating voltage value (U_BU) of the high-voltage intermediate circuit (110) is predefined, and the device (140) controls the discharge circuit (120) by minimizing the current (S_E) through the discharge circuit (120) when the determined voltage (U_ZK) of the high-voltage intermediate circuit (110) is less than the upper operating voltage value (U_BO) and greater than the lower operating voltage value (U_BU) of the high-voltage intermediate circuit (110).

8. The device (140) as claimed in claim 7,
wherein the discharge circuit (120) comprises a linear regulator.

9. The device (140) as claimed in claim 7,
wherein the discharge circuit (120) comprises a switchable load.

10. A drive train (200) having a device (140) as claimed in claim 7.

11. A vehicle (300) having a drive train (200) as claimed in claim 10.

12. The device (140) as claimed in claim 7,
wherein the discharge circuit (120) comprises a switching regulator.

13. The device (140) as claimed in claim 7,
wherein the discharge circuit (120) comprises a DC/DC converter.

14. The device (140) as claimed in claim 9,
wherein the switchable load is a load resistor.

* * * * *